United States Patent [19]

Lucca

[11] Patent Number: 4,637,909
[45] Date of Patent: Jan. 20, 1987

[54] PROCESS FOR PRODUCING DOUBLE-LAYERED STRUCTURES

[75] Inventor: Eusebio Lucca, Viverone, Italy

[73] Assignee: Matec Holding, Switzerland

[21] Appl. No.: 650,110

[22] Filed: Sep. 13, 1984

[30] Foreign Application Priority Data

Sep. 13, 1983 [IT] Italy ............................... 22859 A/83

[51] Int. Cl.⁴ ..................... B29C 43/20; B29C 49/22; B32B 1/10
[52] U.S. Cl. .................................. 264/510; 264/545; 156/145; 156/156
[58] Field of Search ............... 264/510, 512, 516, 545, 264/46.6, 46.8; 156/145, 156

[56] References Cited

U.S. PATENT DOCUMENTS 3,281,301 10/1966 Bolesky ........................... 264/512 X
3,490,973 1/1970 Graff et al. ..................... 264/510 X

FOREIGN PATENT DOCUMENTS 936553 9/1963 United Kingdom ................ 264/512

Primary Examiner—Jan Silbaugh
Attorney, Agent, or Firm—Fidelman, Wolffe & Waldron

[57] ABSTRACT

The process for the production of double-walled mouldings for the reduction of sound in vehicles and engines in general by means of a single pressing operation consists in introducing into a compression mould a double package, each individual package consisting of a layer of prepolymer fibres and a foil of thermoplastics material. The foils of the individual packages are situated facing one another and a medium under pressure is blown in between these foils, in order to cause each package layer to be pressed against the internal face of the corresponding half-mould. The compression mould is heated to a temperature which is sufficient to cause complete melting of said foil and complete polymerization of said prepolymer fibres.

2 Claims, 6 Drawing Figures

PROCESS FOR PRODUCING DOUBLE-LAYERED STRUCTURES

DESCRIPTION

The present patent of invention relates to a process for the production of double-walled mouldings for the attenuation or reduction of sound in vehicles and engines in general. The present invention furthermore relates to the double-walled mouldings produced by this process.

It is known that, in the field of sound reduction in vehicles and engines, double-walled structures may be used, which are obtained by the joining together of two half-shells, which implies an enormous expenditure of energy and manual work. Such conventional operations do not permit the production of a finished product having constant wall thickness properties and a perfectly finished surface appearance.

One objective of the present invention consists in the provision of a process, which enables double-walled mouldings to be obtained by a single pressing operation, the mouldings being filled to a greater or lesser extent with sound-absorbing material.

Another objective of the invention is to provide a process, which enables such a double-walled moulding having both a constant wall thickness and also a perfectly finished surface in regard to appearance to be obtained.

A further objective of the invention consists in the provision of a process, which enables air flow pipes and/or ducts for ventilation having a sound-absorbing internal face to be obtained by means of a single pressing operation, these pipes and/or ducts being suitable for reducing the noise transmitted by the air flow, and also the provision of a process which, by means of a single pressing operation, makes possible the production of sound-absorbing, self-supporting elements, which are suitable for the production of absorption silencers.

These and other objectives of the invention will be readily apparent for the skilled person in this field from the description and the following claims.

The process of this invention is basically characterized by the introduction of a double package, each package consisting of a prepolymerised or semipolymerised fibre layer and a foil of thermoplastics material, into a compression mould, the foils of each part package being situated facing each other, the blowing in of a medium under pressure between said foils for the purpose of causing the pressing of each fibre layer against the internal wall of the corresponding compression mould half and the heating up of said compression mould to a temperature, which is sufficient for bringing about the complete melting of said foil and the complete polymerisation of said fibre material layers.

In this manner, the foils, under the action of the pressure of the gaseous medium acting upon them, press the corresponding layer against the internal surface of the receiving half-mould and impart to this layer a perfect form. Simultaneously, the intimate adhesion of the edges of the fibre layers, compressed and polymerised under thermomechanical pressure, is determined, this pressure being exerted by the half-moulds on these layers.

The double-walled moulding thereby possesses a surface perfectly finished in regard to its appearance and a constant wall thickness of the polymerised fibre layer.

The process according to this invention is explained in more detail by the example described below with reference to the drawings.

Figure 1:
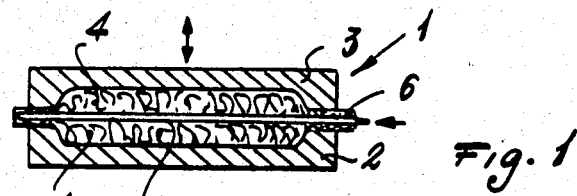
FIG. 1 is a sectional view of a compression mould including a package to be moulded in the mould.
Figure 1A:
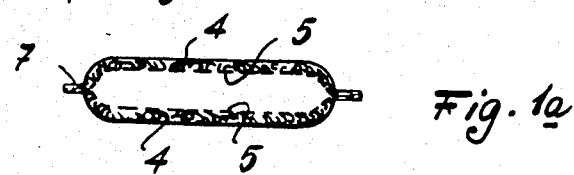
FIG. 1a is a sectional view of a moulding obtained in the mould of FIG. 1.

According to FIG. 1 and 1a of the drawings, a compression mould 1 is used, which consists of a stationary, lower half-mould 2 and a movable, upper half-mould 3, these half-moulds being heated by commonly known means, not illustrated here.

Into the receiving depression of each of the two half-moulds, a package is introduced, each package consisting of a layer 4 of prepolymer fibres having a density of 40 kg/m$^3$ and comprising a thermoplastics foil or a coating 5 of the ionomeric type having a thickness between 30 and 300 micron, with advantage approximately 100 micron.

The layers of fibre material 4 are placed bearing against the internal wall of the corresponding compression mould half, so that the foils 5 face each other.

Air at a pressure of approximately 2 bar and temperature of approximately 200° C. is now blown by means of a nozzle 6 between the two mutually facing aforementioned covering foils, causing both the complete polymerisation of the fibre layers 4 and the melting of the foil 5. By this procedure, the dual effect is achieved that the air exerts pressure upon the foil 5 and thus presses the layers 4 against the internal walls of the corresponding compression mould halves. The layers thereby exactly adopt the form of the pressing pattern, that is the desired profile.

In particular, on account of the raised air temperature, the foil 5 melts and the layers 4 complete their polymerisation. The latter are thereby hardened and, when the resultant moulding is in use, undertake the lad bearing function of the double-walled sound attenuating moulding.

The moulding obtained by the described process does not require any final finishing, in particular not along the edges 7, because on account of the thermomechanical pressure action of the two compression mould halves 2 and 3, these edges are firmly bonded together.

Figure 2:
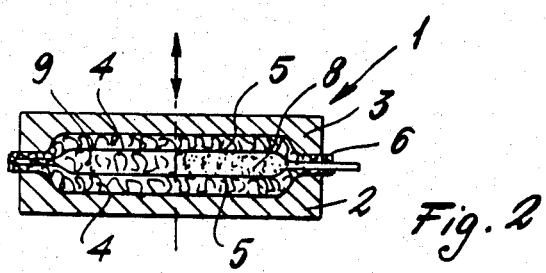
FIG. 2 is a sectional view of a compression mould including a package containing sound-absorbing material between foils to be moulded in the mould.
Figure 2A:
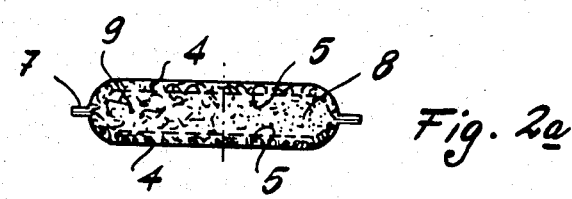
FIG. 2a is a sectional view of a moulding obtained in the mould of FIG. 2.

According to FIG. 2 and 2a it is possible, using the compression mould 1, to obtain double-walled mouldings which are filled, between the mutually facing foils 5, with a sound-absorbing material. The porosity of the introduced sound-absorbing material, for example polyurethane foil 8 containing a high proportion of open cells or indeed prepolymer or semipolymer fibres 9 of the same material as the layers 4, allows the compressed air to pass through the aforementioned filler material and, as described above, to act on foils 5 and compress the fibre layers 4. According to the mass of the fibre material, expressed in kg per m², and the thickness of the inserted foil for constituting the layers 4 and 5, it is, of course, possible to obtain double-walled insulating mouldings, the outer shells of which will be more or less dense and/or more or less porous.

Figure 3:
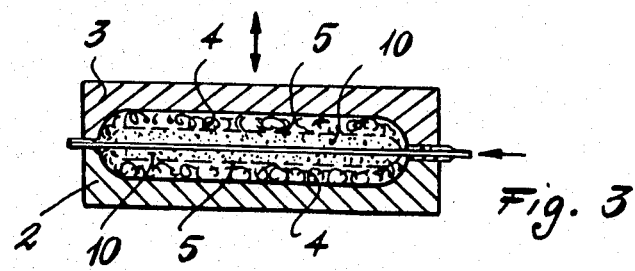
FIG. 3 is a sectional view of a compression mould including a package containing foils with bonded coatings of sound-absorbing material to be moulded in the mould.
Figure 3A:
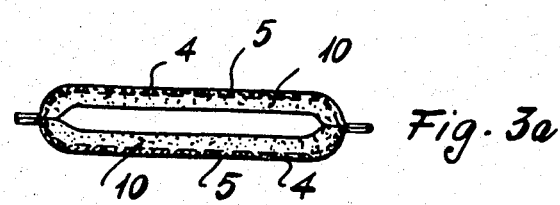
FIG. 3a is a sectional view of a moulding obtained in the mould of FIG. 3.

According to FIG. 3 and 3a, each individual package consists of a layer of fibre material 4 and a foil 5 which has previously been bonded to a coating 10 of sound-absorbing material, for example polyurethane foam having a high proportion of open cells. In this case also the compressed air which passes through the coatings 10 causes pressing of the layers 4 onto the inner faces of the corresponding compression mould halves. The layers 10 will retain values in respect of density and also in respect of specific gravity which are very close to the corresponding starting values; the said materials therefore also have a sound-absorbing action.

The mouldings obtained according to this invention can, of course, have an external final coating adapted to their use; this coating can be applied during the pressing operation.

I claim:

1. Process for the production of a closed hollow moulding substantially filled with an additional sound-absorbing material to provide for sound insulation of vehicles and engines in general by said molding, characterized by the steps of introducing a double package, each package comprising a prepolymerised or semipolymerised fibre layer and a foil of thermoplastics material, into a compression mould, the foils of the double package being disposed facing each other; providing a sound-absorbing material of sufficient porosity to allow a fluid under pressure to pass therethrough; placing a layer of said sound-absorbing material between said foils; introducing a fluid under pressure through said sound-absorbing material and between said foils in order to press each fibre layer against an internal wall of a corresponding compression mould half; applying heat of a temperature which is sufficient for melting said foil and polymerizing said fibre layers completely in order to provide a self-supporting, closed molding; and forming each of said fibre layers against said corresponding mold walls under said pressure and temperature and closing said molding by sealing edges of said packages together.

2. Process according to claim 1, characterized in that fibre layer materials having technical specifications according to the desired compactness of the outer walls of the mouldings are used.

* * * * *